US012663756B2

(12) United States Patent
Cusin et al.

(10) Patent No.: US 12,663,756 B2
(45) Date of Patent: Jun. 23, 2026

(54) WINDING DEVICE, IN PARTICULAR FOR A CLOCK BARREL, PROVIDED WITH DISCONNECTION MEANS

(71) Applicant: Nivarox-FAR S.A., Le Locle (CH)

(72) Inventors: Pierre Cusin, Villars-Burquin (CH); Laurent Jeanneret, Villers-le-Lac (FR)

(73) Assignee: NIVAROX-FAR S.A., Le Locle (CH)

( * ) Notice: Subject to any disclaimer, the term of this patent is extended or adjusted under 35 U.S.C. 154(b) by 280 days.

(21) Appl. No.: 18/501,645

(22) Filed: Nov. 3, 2023

(65) Prior Publication Data

US 2024/0176294 A1 May 30, 2024

(30) Foreign Application Priority Data

Nov. 24, 2022 (EP) .................................... 22209423

(51) Int. Cl.
*G04B 1/20* (2006.01)
*G04B 13/02* (2006.01)

(52) U.S. Cl.
CPC ............. *G04B 1/20* (2013.01); *G04B 13/023* (2013.01)

(58) Field of Classification Search
CPC ... G04B 1/00; G04B 1/10; G04B 1/20; G04B 1/185; G04B 3/10; G04B 5/24; G04B 13/023
See application file for complete search history.

(56) References Cited

U.S. PATENT DOCUMENTS 335,471 A 2/1886 Morlet
3,264,819 A 8/1966 Konrad
9,811,053 B2 * 11/2017 Kirchhof .................. G04B 5/02
10,222,745 B2 3/2019 Calame et al.
10,444,705 B2 * 10/2019 Villar ..................... G04B 9/005
(Continued)

FOREIGN PATENT DOCUMENTS

CH 1 806 568 A4 8/1971
EP 3 220 206 A1 9/2017
FR 1 354 488 A 3/1964
(Continued)

OTHER PUBLICATIONS

European Search Report for Application No. 22 20 9423 dated Apr. 20, 2023.

*Primary Examiner* — Edwin A. Leon
*Assistant Examiner* — Jason M Collins
(74) *Attorney, Agent, or Firm* — Sughrue Mion, PLLC

(57) ABSTRACT

A winding device (1), in particular for a barrel (2) provided with a spring, including a ratchet (3) mounted on a rotary winding shaft (5), the rotary winding shaft (5) being, for example, a winding shaft of the barrel (2), the rotation of which coils the barrel (2), and a winding gear train (4) meshing with the ratchet (3), the rotation of the winding gear train (4) causing the rotation of the ratchet (3) and that of the rotary winding shaft (5) by applying a torque to the ratchet (3), the winding device (1) being provided with means (10) for disconnecting the ratchet (3) and the rotary winding shaft (5), wherein the disconnection means (10) are arranged on the ratchet (3) and on the rotary winding shaft (5), and are configured to disconnect the ratchet (3) and the rotary winding shaft (5) when the torque applied to the ratchet (3) substantially exceeds a threshold value, in particular when the barrel (2) is fully coiled.

12 Claims, 1 Drawing Sheet

(56) References Cited

U.S. PATENT DOCUMENTS

| | | | | |
|---|---|---|---|---|
| 11,112,757 | B2 * | 9/2021 | Marolda | G04B 11/04 |
| 2017/0269550 | A1 * | 9/2017 | Calame | G04B 5/24 |

FOREIGN PATENT DOCUMENTS

| | | | |
|---|---|---|---|
| GB | 190305378 | A | 5/1903 |
| JP | 2009-68656 | A | 4/2009 |
| JP | 2017-201301 | A | 11/2017 |

* cited by examiner

WINDING DEVICE, IN PARTICULAR FOR A CLOCK BARREL, PROVIDED WITH DISCONNECTION MEANS

CROSS REFERENCE TO RELATED APPLICATION

This application claims priority to European Patent Application No. 22209423.7 filed Nov. 24, 2022, the entire contents of which are incorporated herein by reference.

TECHNICAL FIELD OF THE INVENTION

The invention relates to a winding device, in particular for a watch barrel, provided with disconnection means.

The invention also relates to a horological movement including such a winding device.

TECHNOLOGICAL BACKGROUND

Most current mechanical watches with automatic winding generally include an oscillating mass driving a gear train by gravity, the rotation of the drum of which allows to coil a leaf spring, the barrel spring, wound in a drum around an axis, by driving said axis. Rotation is generally forced in one direction only, and is prevented from reversing by a pawl.

However, when the spring is fully coiled, it is important to avoid over-coiling, which could cause the spring to break, or the oscillator to knock, during which the amplitude of oscillation increases to the point where the balance wheel abuts against the back of the anchor horns, causing the rate to drift due to the balance wheel rebounding against these stops.

To avoid these risks, such barrels generally have a system for limiting the coiling of the barrel spring.

This limitation is generally achieved by the sliding of the last outer leaf of the spring against the inner wall of the drum. When the spring is fully coiled and wound around the winding shaft of the barrel, the last wound coil presses against the outer wall of the drum.

Thus, when the coiling torque exceeds the friction torque against the wall of the last coil, the latter starts to slide. To prevent uncontrolled sliding, notches allow the end of the leaf to stop sliding as soon as the coiling torque has dropped sufficiently.

However, the disadvantage of such a system lies in the sliding-friction process of the last coil inside the drum. Indeed, when the mechanism to be driven requires a high torque, the bearing forces and the friction of the spring leaf against the wall are accentuated, leading to wear and a deterioration in the performance of the barrel, even in the presence of grease, which is evacuated from the friction track after a certain time.

Furthermore, within an automatic barrel, it is necessary to meet contradictory criteria to maximise efficiency, such as reduced friction between the coils, and high friction between the spring and the drum to guarantee good coiling torque.

Damage to the drum must also be avoided, such as tearing of the coating, build-up of sludge and wear on the walls under the pressure of the fully coiled spring leaf.

SUMMARY OF THE INVENTION

The purpose of the present invention is to overcome all or some of the aforementioned disadvantages by offering a winding device equipped with a system for limiting the coiling of a spring, which replaces a system based on the sliding of a leaf against notches of an inner wall of the drum.

To this end, the invention relates to a winding device, in particular for a watch barrel provided with a spring, comprising a ratchet mounted on a rotary winding shaft, the rotary winding shaft being, for example, a winding shaft of the barrel, the rotation of which coils the barrel, and a winding gear train meshing with the ratchet, the rotation of the winding gear train causing the rotation of the ratchet and that of the rotary winding shaft by applying a torque to the ratchet, the winding device being provided with means for disconnecting the ratchet and the rotary winding shaft.

The invention is remarkable in that the disconnection means are arranged on the ratchet and on the rotary winding shaft, and are configured to disconnect the ratchet and the winding shaft when the torque applied to the ratchet substantially exceeds a threshold value, in particular when the barrel is fully coiled.

Thus, when the coiling torque is too high, the ratchet hub disconnects from the rotary winding shaft of the barrel and no longer transmits the rotational torque of the ratchet to the winding shaft of the barrel. Thus, the ratchet continues to rotate, driven by the winding gear, but the winding shaft no longer rotates.

Thanks to the invention, the risks of premature wear of the barrel are avoided, as the limiting device is arranged upstream and outside the barrel. In addition, the use of conventional coiling limiting devices based on spring friction inside the barrel is avoided.

According to a particular embodiment of the invention, the disconnection means comprise a plurality of flexible pawls and a first set of teeth, the flexible pawls cooperating with the first set of teeth to transmit the torque from the ratchet to the rotary winding shaft to cause it to rotate.

According to a particular embodiment of the invention, the flexible pawls engage with the first set of teeth when the torque is below the threshold value.

According to a particular embodiment of the invention, the flexible pawls bend when the torque is substantially greater than the threshold value, so that the flexible pawls no longer mesh with the first set of teeth, the rotation of the ratchet no longer driving the rotary winding shaft.

According to a particular embodiment of the invention, the first set of teeth is arranged on the rotary winding shaft and the flexible pawls are arranged on the ratchet.

According to a particular embodiment of the invention, the ratchet comprises a hub on which the flexible pawls are arranged, the flexible pawls extending towards the rotary winding shaft.

According to a particular embodiment of the invention, the rotary winding shaft is arranged through the hub of the ratchet, the first set of teeth being arranged around the rotary winding shaft at the hub.

According to a particular embodiment of the invention, the flexible pawls are angularly distributed around the rotary winding shaft.

According to a particular embodiment of the invention, each pawl comprises a flexible leaf and a tooth arranged at the free end of the flexible leaf, the teeth of the flexible pawls cooperating with the first set of teeth.

According to a particular embodiment of the invention, the ratchet comprises a peripheral rim provided with a second peripheral set of teeth cooperating with a third set of teeth of the winding gear train.

According to a particular embodiment of the invention, the ratchet is mounted on the barrel.

According to a particular embodiment of the invention, the rotary winding shaft is the winding shaft of the barrel allowing to coil the barrel spring.

According to a particular embodiment of the invention, each flexible pawl is directed in a radial direction with respect to the ratchet and the winding axis.

The invention also relates to a horological movement comprising a barrel, the horological movement including such a barrel winding device.

BRIEF DESCRIPTION OF THE FIGURES

The aims, advantages and features of the present invention will become apparent from several embodiments given only by way of non-limiting examples, with reference to the appended drawings wherein.

DETAILED DESCRIPTION OF THE INVENTION

Figure 1:
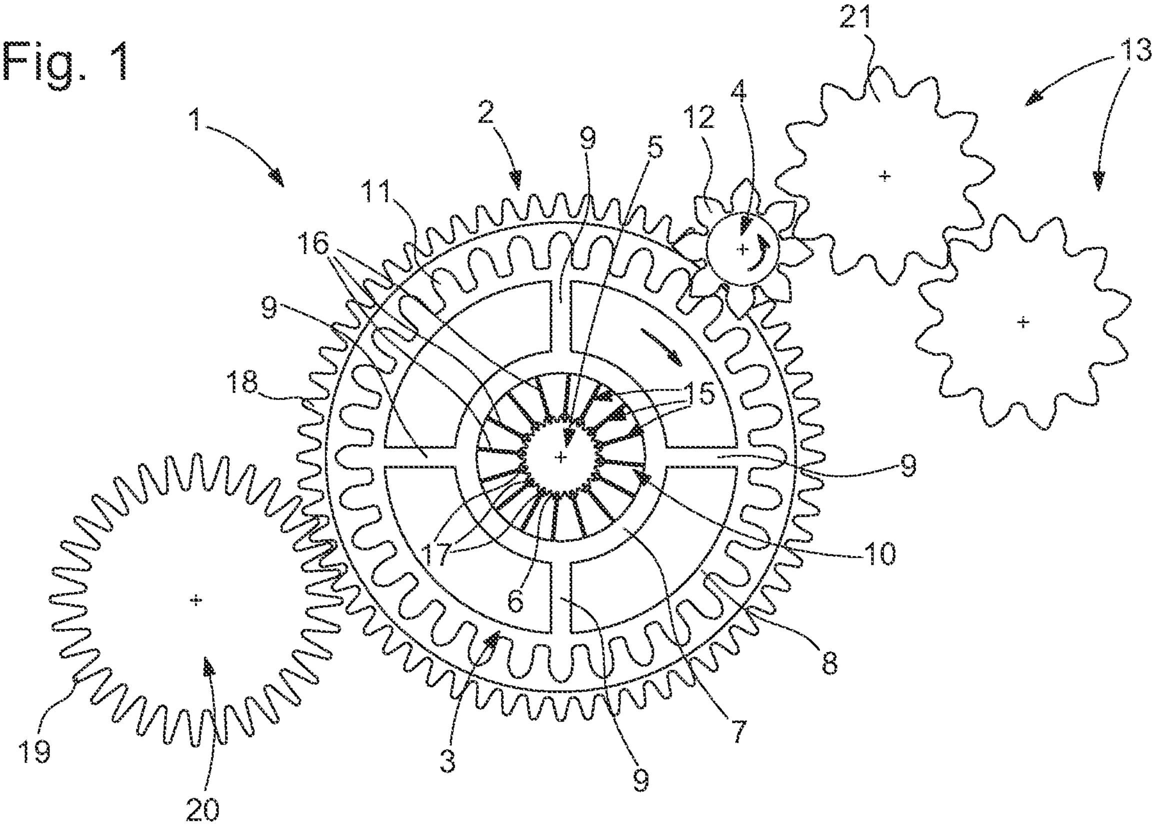
FIG. 1 schematically shows a top view of a winding device according to one embodiment of the invention, in the engaged position, and FIG. 2 schematically shows a top view of the winding device according to the invention of FIG. 1, in the disconnected position, in particular when the barrel spring is fully coiled.
Figure 2:
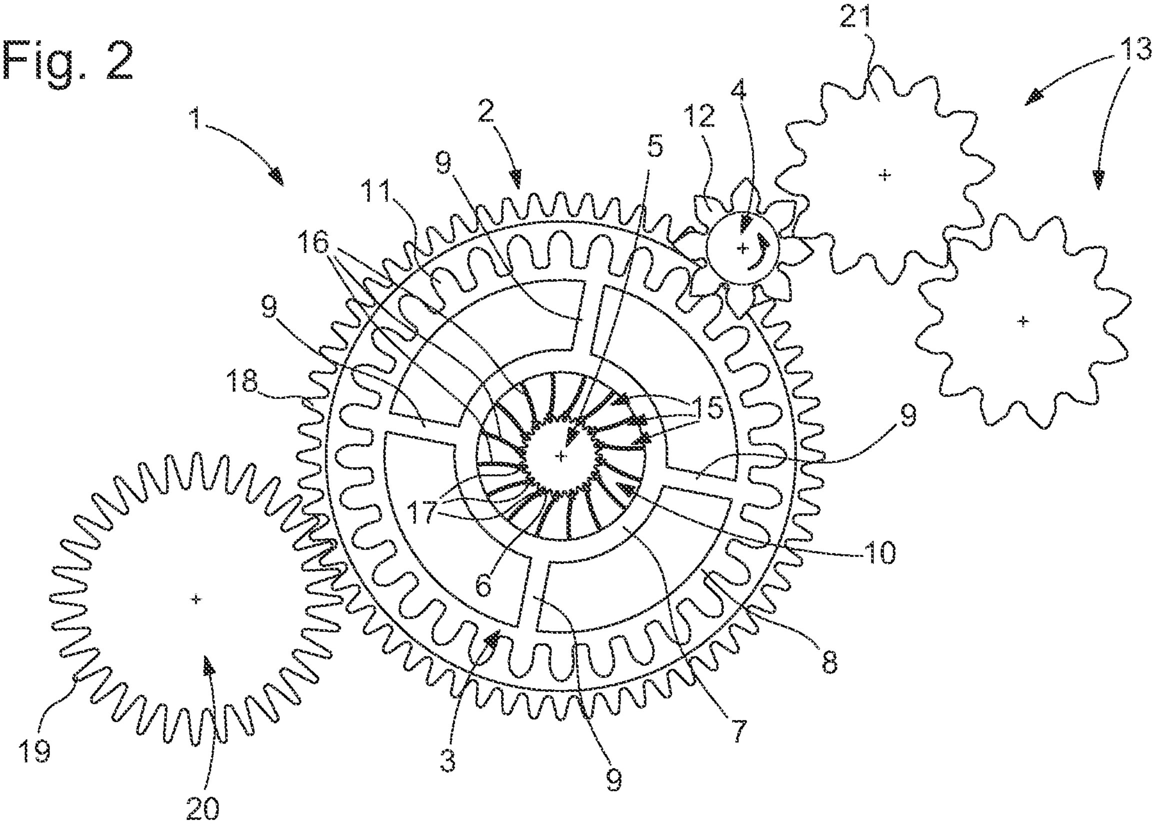

FIGS. 1 and 2 show an embodiment of a winding device 1, in this case a barrel 2 of a timepiece, according to the invention.

The winding device 1 of the barrel 2 comprises a ratchet 3 and a winding gear train 4. The winding gear train 4 meshes with the ratchet 3, so that when the winding gear train 4 is rotated in a first direction, the ratchet 3 is rotated in a second direction opposite to the first direction.

The ratchet 3 is mounted on a winding shaft 5, the winding shaft 5 allowing to wind the barrel 2. In the example, the winding shaft 5 is the winding shaft of the barrel 2, the ratchet being mounted on the barrel 2.

In a variant, not shown, the winding shaft is not mounted on the barrel, the winding shaft comprising a pinion meshing with a wheel set driving the winding shaft of the barrel to coil the spring, if the ratchet is not mounted on the barrel.

The winding shaft 5 is preferably cylindrical. A first set of teeth 6 is arranged around the winding shaft 5.

The ratchet 3 comprises a hub 7 and a peripheral rim 8, the hub 7 being arranged inside the peripheral rim 8. The hub 7 and the peripheral rim 8 are shaped like circular rings, the hub 7 having a radius smaller than that of the peripheral rim 8. The hub 7 and the peripheral rim 8 are connected by at least one arm, in this case four arms 9 angularly distributed around the hub 7. The hub 7 and the peripheral rim 8 preferably extend in the same plane.

The hub 7 delimits an internal space through which the winding shaft 5 passes at least in part.

The peripheral rim 8 comprises a second external set of teeth 11 distributed along the peripheral rim 8 around the ratchet 3. The second set of teeth 11 cooperates with a third set of teeth 12 arranged on the winding gear train 4. The winding gear train 4 comprises a pinion provided with the third set of teeth 12 arranged at its periphery.

The barrel 2 includes a spiral-wound spring called barrel spring (not shown in the figures) arranged inside the barrel 2, which must be coiled either by an automatic winding system or by a manual winding system.

To this end, the winding device 1 further comprises a gear train system 13, for example driven by an automatic winding mass (not shown in the figures) of the horological movement. The gear train system 13 can also be driven by a winding stem (not shown in the figures) that can be operated by means of a crown, in the case of manual winding.

A wheel set 21 of the gear train system 13 meshes with the third set of teeth 12 of the winding gear train 4. Thus, by actuating the gear train system 13, a torque is applied to the ratchet 4, which transmits it at least in part to the winding shaft 5 via the winding gear train 4 driven by the wheel set 21, and via the ratchet 3 driven by the winding gear train 4.

According to the invention, the winding device 1 comprises means 10 for disconnecting the ratchet and the winding shaft. The disconnection means 10 include the first set of teeth 6 arranged around the winding shaft 5, preferably at the same level as the ratchet 3.

The disconnection means 10 also include a plurality of flexible pawls 15 extending from the hub 7 towards the winding shaft 5. The flexible pawls 15 are angularly distributed inside the hub 7, in the plane of the ratchet 3. The flexible pawls 15 cooperate with the first set of teeth 6, so that rotation of the ratchet 3 causes rotation of the winding shaft 5 when the barrel 2 is wound.

Each pawl 15 comprises a flexible leaf 16 extending from the hub 7 of the ratchet 3. A tooth 17 capable of cooperating with the first set of teeth 6 of the winding shaft 5 is arranged at the free end of each flexible leaf 16. During winding, the teeth 17 of the flexible pawls 15 are inserted into the first set of teeth 6 to rotate it.

The disconnection means 10 comprise at least one flexible pawl 15, preferably at least four flexible pawls. The number of flexible pawls 15 depends on the flexibility of the flexible leafs 16, and on the threshold value of the torque beyond which the disconnection means 10 are configured to disconnect the ratchet 3 and the winding shaft 5.

Each flexible pawl 15 is directed in a radial direction with respect to the ratchet 3 and the winding axis 5. In other words, the flexible pawls 15 are oriented towards the axis of the winding shaft 5.

In this embodiment, the disconnection means 10 comprise sixteen flexible pawls 15 distributed around the winding shaft.

The flexible leafs 16 are configured to bend beyond a torque threshold usually required to coil the barrel. Thus, above a threshold value, when the torque is too high, the flexible leafs 16 bend, so that the teeth 17 of the flexible pawls 15 jump into the first set of teeth without being able to drive it. As a result, the winding shaft 5 no longer rotates despite the rotation of the ratchet 3.

In FIG. 1, in the winding configuration, the winding torque exerted on the winding shaft by the ratchet 3 is less than the threshold value, so that the flexible leafs 16 of the flexible pawls 15 remain substantially straight. Thus, the flexible pawls 15 drive the winding shaft 5 via the first set of teeth 6.

In FIG. 2, when the barrel 2 is fully coiled, the torque exerted on the winding shaft 5 by the ratchet 3 exceeds the threshold value, so that the flexible leafs 16 of the flexible pawls 15 bend. In other words, the torque required to rotate the winding shaft 5 becomes too great for the flexible pawls, which bend. As a result, the teeth 17 of the flexible pawls 15 no longer have sufficient grip on the first set of teeth 6 to drive the winding shaft 5.

These disconnection means protect the barrel 2 from over-coiling and prevent premature wear inside the barrel 2.

The barrel 2 further includes a fourth peripheral set of teeth 18 configured to cooperate with a fifth set of teeth 19 of a wheel set 20 of the horological movement. The wheel set 20 is, for example, a centre wheel set or an average wheel, or else a striking wheel set. Once coiled, the barrel 2 supplies the energy required to operate the horological movement via the wheel set 20.

The invention also relates to a horological movement, not shown in the figures, the movement comprising a barrel and a barrel winding device as described above.

Naturally, the invention is not limited to the embodiments described with reference to the figures, and variants could be considered without departing from the scope of the invention.

For example, in the embodiment shown in FIGS. 1 and 2, the flexible pawls 15 are arranged on the ratchet 3 and the first set of teeth 6 is arranged on the winding shaft 5.

But in another embodiment, not shown, it is possible to dispose the flexible pawls on the winding shaft and to arrange a first set of teeth inside the ratchet hub. The flexible leafs of the flexible pawls extend from the winding shaft towards the ratchet hub so as to cooperate with the first set of teeth.

Thus, as long as the torque exerted on the flexible pawls is below a threshold value, the ratchet drives the winding shaft, and when the torque exerted on the flexible pawls exceeds the threshold value, the flexible leafs bend and no longer mesh with the first set of teeth, the ratchet rotating without driving the winding shaft.

The invention claimed is:

1. A winding device (1) for a barrel (2) provided with a spring, comprising:

a ratchet (3) mounted on a rotary winding shaft (5), the rotary winding shaft (5) being a winding shaft of the barrel (2), the rotation of which about a winding axis coils the barrel (2);

a winding gear train (4) meshing with the ratchet (3), the rotation of the winding gear train (4) causing the rotation of the ratchet (3) and that of the rotary winding shaft (5) by applying a torque to the ratchet (3); and disconnecting means (10) for disconnecting the ratchet (3) and the rotary winding shaft (5), the disconnection means (10) being arranged on the ratchet (3) and on the rotary winding shaft (5), and disconnecting the ratchet (3) and the rotary winding shaft (5) when the torque applied to the ratchet (3) substantially exceeds a threshold value, when the barrel (2) is fully coiled, wherein the disconnection means (10) comprise a plurality of flexible pawls (15), and wherein the ratchet (3) comprises a hub (7) forming a circular ring around the rotary winding shaft (5) and on which the flexible pawls (15) are arranged, the flexible pawls (15) extending radially from the hub (7) towards the winding axis.

2. The winding device according to claim 1, wherein the disconnection means (10) further comprises a first set of teeth (6), the flexible pawls (15) cooperating with the first set of teeth (6) to transmit the torque from the ratchet (3) to the rotary winding shaft (5) to cause it to rotate.

3. The winding device according to claim 2, wherein the flexible pawls (15) engage with the first set of teeth (6) when the torque is below the threshold value.

4. The winding device according to claim 2, wherein the flexible pawls (15) bend when the torque is substantially greater than the threshold value, so that the flexible pawls (15) no longer mesh with the first set of teeth (6), the rotation of the ratchet (3) no longer driving the rotary winding shaft (5).

5. The winding device according to claim 2, wherein the first set of teeth (6) is arranged on the rotary winding shaft (5) and the flexible pawls (15) are arranged on the ratchet (3).

6. The winding device according to claim 5, wherein the rotary winding shaft (5) is arranged through the hub (7) of the ratchet (3), the first set of teeth (6) being arranged around the rotary winding shaft (5) at the hub.

7. The winding device according to claim 2, wherein the flexible pawls (15) are angularly distributed around the rotary winding shaft (5).

8. The winding device according to of claim 2, wherein each pawl (15) comprises a flexible leaf (16) and a tooth (17) arranged at the free end of the flexible leaf (16), the teeth (17) of the flexible pawls (15) cooperating with the first set of teeth (6).

9. The winding device according to claim 1, wherein the ratchet (3) comprises a peripheral rim (8) provided with a second peripheral set of teeth (11) cooperating with a third set of teeth (12) of the winding gear train (4).

10. The winding device according to claim 1, wherein the ratchet (3) is mounted on the barrel (2).

11. The winding device according to claim 1, wherein the rotary winding shaft (5) is the winding shaft of the barrel (2) that allows coiling of the barrel (2) provided with the spring.

12. A horological movement comprising the barrel (2) and the winding device (1) according to claim 1.

* * * * *